United States Patent [19]

Holzhauser et al.

[11] 3,771,381
[45] Nov. 13, 1973

[54] MINIATURE ELECTRIC TREND RECORDER HIGH TORQUE SPEED REDUCER

[75] Inventors: Emil Holzhauser; Robert D. Rea, both of Fort Washington, Pa.

[73] Assignee: Honeywell Inc., Minneapolis, Minn.

[22] Filed: June 30, 1972

[21] Appl. No.: 268,037

[52] U.S. Cl. .................................. 74/421 R, 74/413
[51] Int. Cl. ............................ F16h 1/20, F16h 1/06
[58] Field of Search ............... 74/421 R, 413, 412 R

[56] References Cited
UNITED STATES PATENTS 1,042,769   10/1912   Collins et al. .................... 74/421 R
3,369,421   2/1968   Short et al. ........................ 74/421 R Primary Examiner—Leonard H. Gerin
Attorney—Arthur H. Swanson et al.

[57] ABSTRACT

Each one of a preselected plurality of similar gears are stacked together in order to form a gear drive and each gear in turn is mounted within and supported for rotation on separate internal bearing walls which form cavities in each one of a series of stacked plates in order to provide a small, high torque gear reduction unit.

10 Claims, 3 Drawing Figures

PATENTED NOV 13 1973

3,771,381

MINIATURE ELECTRIC TREND RECORDER HIGH TORQUE SPEED REDUCER

Prior to the present invention it has been the conventional practice to mount gears of reduction drives on shafts which were in turn mounted on bearings formed in the gear casing that surrounds the reduction drive gears.

When heavy loads are transmitted through the teeth of the aforementioned conventional shaft supported gear reduction units it is necessary to employ shafts of extremely large diameter so that these units can withstand the high torque being transmitted. The high cost of manufacturing these shaft mounted speed reducing units and the large space which is required for each of these units does not allow them to be used in many present day applications such as in miniaturized instrumentation where reduced cost and size of the reduction unit must be achieved.

A miniature high torque preselected speed reducer is achieved by:

1. Allowing the circular internal wall that forms a cavity in each of the previously mentioned stacked plates to act as a bearing surface along which the gear associated with each of these plates can transmit its tooth load to the next succeeding gear and, 2. Selecting the correct number of identical gear units desired and the identical number of associated plate bearing units that are necessary to provide the desired reduction in speed and at the same time be able to achieve miniaturization and reduction in the cost of manufacturing high torque speed reducers.

A better understanding of the present invention may be had from the following description when read in connection with the accompanying drawing in which.

Figure 1:
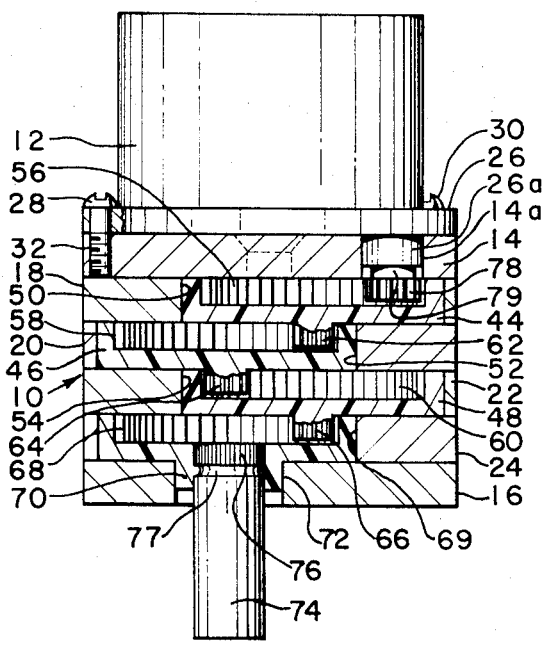
FIG. 1 is a view showing the unique high torque miniature speed reducer being employed as a driving unit between a motor drive shaft at one end of the drive and an output shaft at the other end of the speed reduction drive.

Referring now to the drawing in detail there is shown in FIG. 1 the forementioned unique speed reducing unit 10 being driven by an electric motor 12. It should be noted that, for the sake of clarity, the parts in FIG. 1 are purposely shown twice their actual size.

As is best shown in FIG. 1 the speed reducing unit 10 is comprised of two end plates 14, 16 and a plurality of identically constructed gear support plates 18, 20, 22, 24.

The end plate 14 is connected to the flange 26 which forms a part of the motor 12 by means of a pair of connectors 28, 30 that are threadedly connected at 32, 34 to the end plate 14.

Although other materials can be used, the plates 14-24 are preferably made of either an aluminum or steel material that is coated with a self lubricating bearing material such as the bearing material trade named Teflon.

The plates 18, 20, 22, 24 are identical and are each provided with associated circular wall portions 36; 38; 40; 42 that form cavities that are of the same diameter.

FIG. 1 shows each one of a series of identical gear cluster units 44; 46; 48 mounted along their outer peripheral surfaces 50; 52; 54 for rotary sliding movement in a running fit manner with respect to their associated coated support plates 18, 20, 22.

Each of these gear cluster units 44, 46 48 shown in FIG. 1 contain identical internal gears 56; 58; 60 and identical pinions 62, 64. Each of the pinions 62, 64 are shown in FIG. 1 projecting in a downward direction and into driving engagement with a different one of the internal gears 58; 60.

A pinion 66 is shown on FIG. 1 projecting in a downward direction and into driving engagement with an internal gears 68. The internal gears 68 is mounted for rotary sliding movement in a running fit manner at 69 with the inner wall 42 of the previously mentioned coated support plate 24.

The internal gear 68 has a cylindrically shaped embossed portion 70 protruding through and in rotatable running fit engagement with a wall 72 forming an aperture in the end plate 16.

An output drive shaft 74, which may be made of steel, is shown having a straight knurl or splined finish 76 and a wall 77 forming an angular groove to facilitate the molding of the upper end of the shaft 74 as an integral unit to the embossed portion 70.

A cylindrical boss portion 26a protrudes from the lower surface of the motor flange 26 so that it can be inserted into wall 14a forming a cylindrical aperature in the end plate 14. In this way the pinion 78, which is fixably mounted on the motor shaft 79, can be readily assembled in a correct drive engaging position with the internal gear 56.

Figure 2:
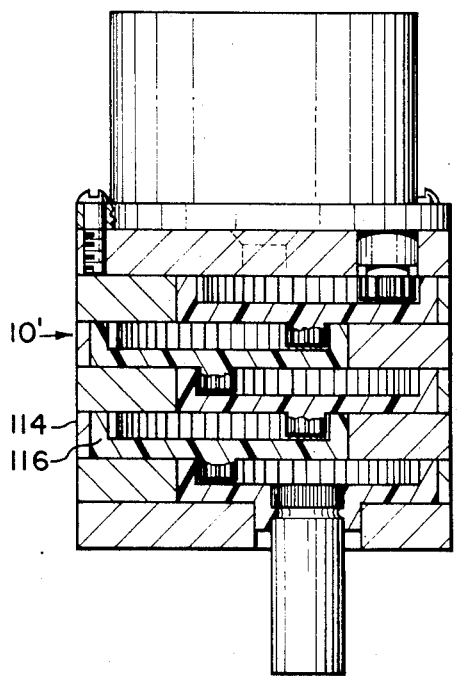
FIG. 2 shows how an additional drive unit can be added to the type of construction shown in FIG. 1 to obtain a different speed reduction and, FIG. 3 shows an exploded view of the plates employed in the gear reduction units shown in FIGS. 1 and 2.
Figure 3:
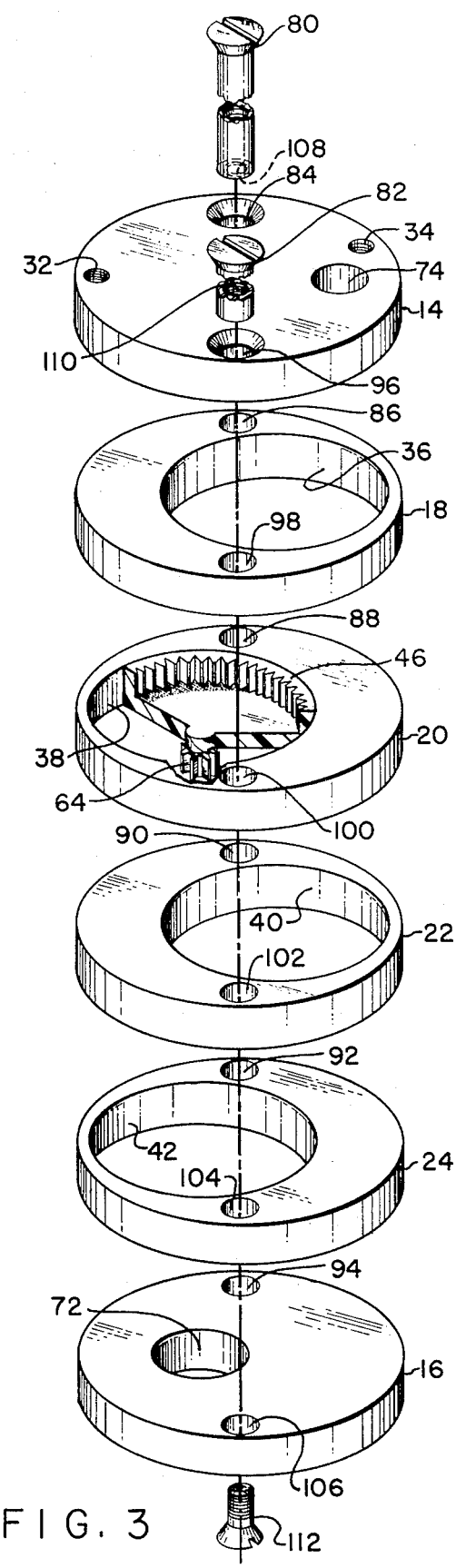

From the aforementioned description of FIGS. 1 and 2 it can be seen that the motor pinion 78 cluster gear units 44, 46, 48, the internal gear 68 and its associated drive shaft 74 can readily be assembled in their associated plates 14, 16, 18, 20, 22 and 24. It can also be seen from the aforementioned description and by observing FIG. 3 that this miniature assembly of gears and plates are assembled as shown in FIG. 1 and then held together in this position so that a pair of hollow connecting rods 80, 82 can be passed through the pair of parallel aligned apertures 84-94 and 96-106 as shown in FIG. 3.

The ends of the connecting rods, 80, 82 contain threaded inner wall surfaces 108, 110 into each of which a separate threaded member such as screw 112 can be threadedly engaged in order to bring all of the plates 14-24 into fixed surface to surface contact with one another and to thereby complete the final assembly of the unit 10.

All of the parts employed in the high torque miniature speed reducer 10 are employed in the high torque miniature speed reducer unit 10' shown in FIG. 2. It should be noted that an additional plate 114 and an additional gear cluster 116 that are identical to those similar parts already described has been added in order to change the speed reduction of FIG. 1 into the FIG. 2 speed reducer version 10'. FIG. 2 is therefore shown to illustrate how one or more additional gear clusters and their associated bearing plates can be added to the gear cluster and bearing plates shown in FIG. 1 in order to provide a different stepped down speed reduction from that which is possible with the version shown in FIG. 1.

In order to provide a high output speed with less reduction than that aforded by the construction shown on FIG. 1 a substitute gear can be employed in place of the internal gear 56 which has less teeth than the internal gear 56.

If an even higher output speed is desired than that just described, a gear containing less teeth can be substituted for the internal gears 56 and 58 than that illustrated in FIG. 1.

From the aforementioned description it can be seen that an unusually small, high torque, speed reduction gear drive unit, whose diameter is one and five sixteenth inches and whose height is one inch is provided which is useful for many different applications such as a chart drive employed in a recording instrument.

The extremely small unit which is shown twice its actual size in FIG. 1, can, for example, be employed to reduce the 3.6 revolutions per minute input speed of a motor 12 down to 0.20833 revolutions per hour. This unit can therefore be usefully employed to drive a chart at the extremely low speed of three quarter inches per hour.

By substituting suitable gears of the type previously described for either the gear 56 or the gear 56 and the gear 58 shown in FIG. 1 it is possible to increase the chart speed from the previously mentioned three quarter inches per hour to 1 ½ inches per hour respectively.

It can thus be seen that the aforementioned modular stack construction of the speed reducing unit 10 enables one to obtain a large number of input to output reductions without altering the overall design of the reduction unit.

The embodiments of the invention in which an exclusive property or privilege is claimed are defined as follows:

1. A high torque speed reducing apparatus, comprising a drive gear, at least one gear reducing unit having an internal gear which has an internal tooth surface positioned in driven engagement with said drive gear and a stationary plate having a bearing surface positioned about a smooth external peripheral wall of said internal gear to maintain the axis of said gear about which it is rotated in a substantially fixed position.

2. The high torque speed reducing apparatus defined in claim 1, wherein each speed reducing drive unit contains a drive pinion that forms an integral part of its associated internal gear.

3. The high torque speed reducing apparatus defined in claim 1, wherein each speed reducing drive unit contains a drive pinion that forms an integral part of its associated internal gear and wherein the drive pinion formed on a first one of said speed reducing drive units is positioned in driving engagement with an internal gear forming a second one of the speed reducing drive units.

4. The high torque speed reducing apparatus as defined in claim 1, wherein each of said reducing units are of an identical construction and interchangeably mounted in a stacked fashion with one another in any one of a number of different combinations.

5. The high torque speed reducing apparatus as defined in claim 1, wherein each of said stationary bearing plates are of an identical construction and interchangeably mounted in a stacked fashion with one another in any one of a number of different combinations.

6. The high torque speed reducing apparatus as defined in claim 1, wherein said bearing surface of each of said plates form an annular inner wall surface that is in running fit engagement with the outer peripheral wall of the internal gear with which it is associated.

7. The high torque speed reducing apparatus as defined in claim 1, wherein each of said plates are of a disc shaped configuration and wherein a cylindrical wall extends between its two flat sides to form its bearing surface.

8. The high torque speed reducing apparatus as defined in claim 1, wherein each of said plates are of a disc shaped configuration and wherein a cylindrical wall extends between its two flat sides and about an axis that is displaced from the central axis of the disc to form its bearing surface.

9. The high torque speed reducing apparatus as defined in claim 1, wherein an adjustable connecting means is employed to maintain the flat sides of said stationary plates in a fixed stacked relation with one another.

10. The high torque speed reducing apparatus as defined in claim 1, wherein the drive gear is constructed of a metallic material, the gear reducing units of a self lubricating plastic material and the stationary plates of a metallic material covered with a self-lubricating material.

* * * * *